US010495181B2

(12) United States Patent
Stephens

(10) Patent No.: US 10,495,181 B2
(45) Date of Patent: Dec. 3, 2019

(54) KNOTLESS SECURING APPARATUS AND METHODS FOR USING SAME

(71) Applicant: Rod D. Stephens, Morgan, UT (US)

(72) Inventor: Rod D. Stephens, Morgan, UT (US)

(*) Notice: Subject to any disclaimer, the term of this patent is extended or adjusted under 35 U.S.C. 154(b) by 114 days.

(21) Appl. No.: 15/281,386

(22) Filed: Sep. 30, 2016

(65) Prior Publication Data

US 2018/0094696 A1 Apr. 5, 2018

(51) Int. Cl.
*F16G 11/04* (2006.01)

(52) U.S. Cl.
CPC .................. *F16G 11/046* (2013.01)

(58) Field of Classification Search
CPC ...... F16G 11/146; F16G 11/14; F16G 11/046; Y10T 24/3916; Y10T 24/3927
See application file for complete search history.

(56) References Cited

U.S. PATENT DOCUMENTS

| | | | | | |
|---|---|---|---|---|---|
| 329,071 | A | * | 10/1885 | Palmer | F16G 11/00 |
| | | | | | 24/129 R |
| 1,361,249 | A | * | 12/1920 | Giffin | B66C 1/14 |
| | | | | | 24/129 A |
| 1,546,798 | A | * | 7/1925 | Seagren | F16G 11/14 |
| | | | | | 24/129 B |
| 1,613,635 | A | * | 1/1927 | Zimmerlund | F16G 11/14 |
| | | | | | 24/129 B |
| 2,439,141 | A | * | 4/1948 | Meighan | F16G 11/046 |
| | | | | | 24/129 R |
| 3,069,739 | A | * | 12/1962 | Jorgenson | F16G 11/046 |
| | | | | | 24/129 R |
| 5,394,712 | A | * | 3/1995 | Chou | E05B 67/063 |
| | | | | | 70/226 |
| 6,154,932 | A | * | 12/2000 | Karg | F16G 11/046 |
| | | | | | 24/131 R |
| 2015/0176678 | A1 | * | 6/2015 | Burrell | F16G 11/046 |
| | | | | | 24/129 R |
| 2018/0021123 | A1 | * | 1/2018 | Moore | A61F 2/08 |
| | | | | | 606/232 |

* cited by examiner

*Primary Examiner* — Victor D Batson
*Assistant Examiner* — Matthew J Sullivan
(74) *Attorney, Agent, or Firm* — FisherBroyles, LLP

(57) ABSTRACT

Knotless securing apparatuses includes a central support member having a first end portion and a second opposing end portion. A first receiving ring and a second receiving ring each extend from the first end portion of the central support member, and diverge away from each other. A third receiving ring extends away from the second opposing end portion. The apparatus may form a "Y" shape. Methods of using such apparatuses include passing a bight of a rope through the third receiving ring and over the second receiving ring to rest over the first end portion of the central support member between the first and second receiving rings. A working part of the rope is passed between a standing part of the rope and the third receiving ring, over the second receiving ring, and over the bight that is resting over the end portion of the central support member.

19 Claims, 10 Drawing Sheets

KNOTLESS SECURING APPARATUS AND METHODS FOR USING SAME

TECHNICAL FIELD

This disclosure relates to the field of securing apparatuses and, more particularly, to a securing apparatus for securing a rope to a fixed body without the use of a knot, and wherein the rope may be selectively released under tension.

BACKGROUND

Over time, several types of knots have been developed to secure an object or thing to a fixed member by means of a rope. If a load is applied to the rope, these types of conventional knots were developed so as to not fail or release the secured relationship between the object and the fixed member.

A common knot used when securing one object to another under a load is the self-binding trucker's hitch knot. There are several variations of the trucker's hitch knot, all of which use a loop in the standing part of the rope as a make-shift pulley in order to obtain a mechanical advantage for cinching a load down or otherwise making a rope taut. The knots formed in the trucker's hitch, however, when loaded, can become difficult, if not impossible, to untie.

Furthermore, if a tied horse becomes scared or frightened, the horse will generally attempt to run from the thing or object scaring him. If a horse is tied to a fixed or an immovable object, such as a pole, a horse trailer, a wall, or a fence, and becomes frightened, the horse typically "hangs back" or tries to pull away from the object to which the horse is fastened, thereby putting tension on the securing knot. The horse will also typically continue this pulling behavior until harming himself, breaking the securing hardware, or will lunge forward trying another method of escape. Because the securing knot is under tension and a force load has been applied, thereby tightening the knot, it is often impossible to release the securing knot and, accordingly, release the secured relationship between the horse and the fixed member without cutting the rope.

BRIEF SUMMARY

In some embodiments, the present disclosure includes knotless securing apparatuses that include a central support member having a first end portion and a second opposing end portion. A first receiving ring extends away from the first end portion of the central support member and a second receiving ring extends away from the first end portion of the central support member. The first and second receiving rings diverge away from each other. A third receiving ring extends away from the second opposing end portion of the central support member.

In some embodiments, the present disclosure includes methods of using such knotless securing apparatuses. In accordance with such methods, a bight of a rope is passed through the third receiving ring and over the second receiving ring to rest over the first end portion of the central support member, between the second receiving ring and the first receiving ring. A working part of the rope is passed between a standing part of the rope and the third receiving ring, around the second receiving ring, and over the bight that is over the first end portion of the central support member.

In some embodiments, the present disclosure includes knotless securing apparatuses that include a central support member having a first end portion and a second opposing end portion, the first end portion having a greater width than the second opposing end portion when the knotless securing apparatus is viewed from a side. A first receiving ring includes a first opening sized and shaped to receive a portion of a rope, the first receiving ring extending away from the first end portion of the central support member. A second receiving ring includes a second opening sized and shaped to receive a portion of a rope, the second receiving ring extending away from the first end portion of the central support member, the first and second receiving rings spaced apart and diverging away from each other. A third receiving ring includes a third opening sized and shaped to receive a portion of a rope, the second receiving ring extending away from the second opposing end portion of the central support member. The first receiving ring, second receiving ring, and third receiving ring form a Y shape when the knotless securing apparatus is viewed from the side.

DETAILED DESCRIPTION

The following description provides specific details in order to provide a thorough description of embodiments of the present disclosure. However, a person of ordinary skill in the art will understand that the embodiments of the present disclosure may be practiced without employing these specific details. Indeed, the embodiments of the present disclosure may be practiced in conjunction with conventional fabrication techniques and materials employed in the industry.

In the following detailed description, reference is made to the accompanying drawings, which form a part hereof, and in which is shown, by way of illustration, specific embodiments in which the present disclosure may be practiced. These embodiments are described in sufficient detail to enable a person of ordinary skill in the art to practice the present disclosure. However, other embodiments may be utilized, and changes may be made without departing from the scope of the disclosure. The illustrations presented herein are not meant to be actual views of any particular system, device, structure, use, or process, but are idealized representations that are employed to describe the embodiments of the present disclosure. The drawings presented herein are not necessarily drawn to scale.

As used herein, the terms "substantially" and "about" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, any relational term, such as "first," "second," "over,""top," etc., is used for clarity and convenience in understanding the disclosure and accompanying drawings and does not connote or depend on any specific preference, orientation, or order, except where the context clearly indicates otherwise.

The embodiments of the present disclosure include knotless securing apparatuses for securing an elongated engagement member (e.g., rope, cord, chain) without permanently binding the engagement member to itself or to the apparatuses. The knotless securing apparatuses of the present disclosure may include first, second, and third receiving rings in the general shape of 4 "Y," each for receiving a bight or loop of the elongated engagement member. The knotless securing apparatuses may be used to secure objects to each other, to secure a horse or other animal to a structure, to cinch down a load with a single elongated engagement member, or for other uses.

Figure 1:
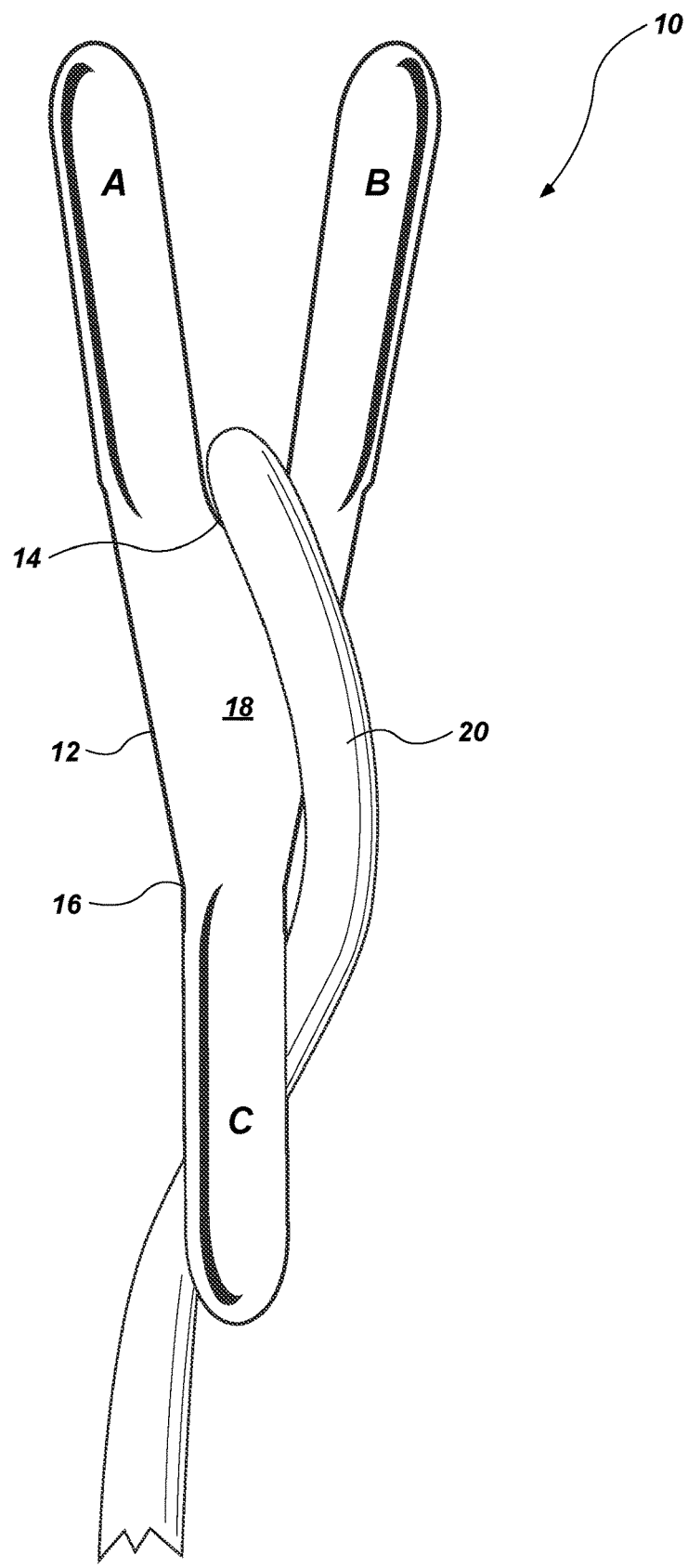
FIG. 1 is a side view of an embodiment of a knotless securing apparatus, shown in use with an engaging member.

FIG. 1 is a side view of a knotless securing apparatus 10. As shown, the knotless securing apparatus 10 may include a central support member 12 having a first end portion 14, a second opposing end portion 16, and an intermediate portion 18 disposed between the first and second ends 14, 16. The intermediate portion I 8 of the central support member 12 may be formed having a length that tapers from the first end portion 14 to the second end portion 16, as shown in FIG. 1. In other words, the first end portion 14 may have a greater width than the second end portion 16 when viewed from the side view perspective of FIG. 1.

Extending from the first end portion 14 of the central support member 12 are a first receiving ring A and a second receiving ring B. The first and second receiving rings A, B may be positioned at a spaced-apart distance from each other, which distance may increase along a respective length of each of the receiving rings A, B that extends outwardly from engagement at the first end portion 14 of the central support member 12. Thus, the first and second receiving rings A, B may diverge from each other, such as at an angle between about 5 degrees and about 25 degrees. For example, the first and second receiving rings A, B may diverge from each other at an angle between about 10 degrees and about 20 degrees, such as about 15 degrees.

Figure 2:
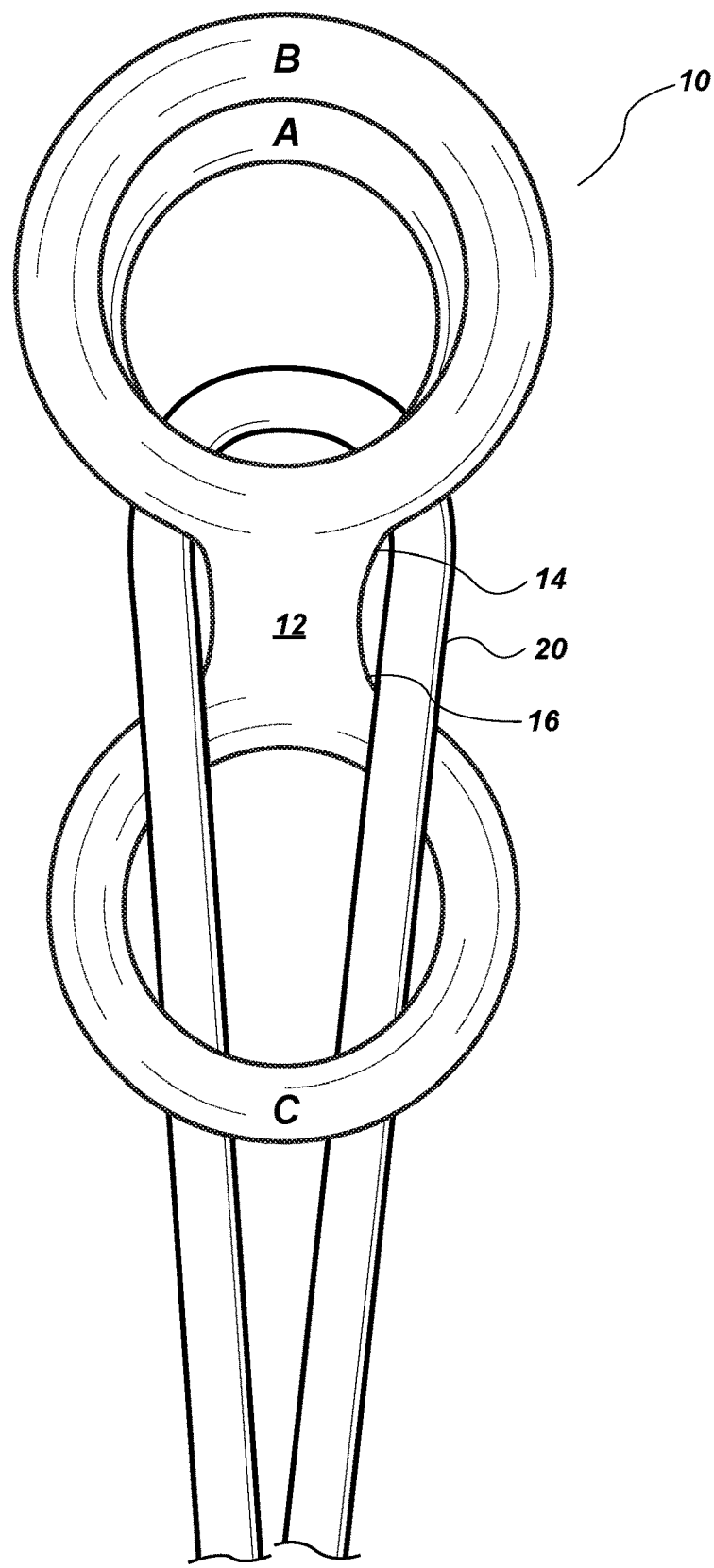
FIG. 2 is a perspective view of the knotless securing apparatus of FIG. 1, shown in use with the engaging member.
Figure 7:
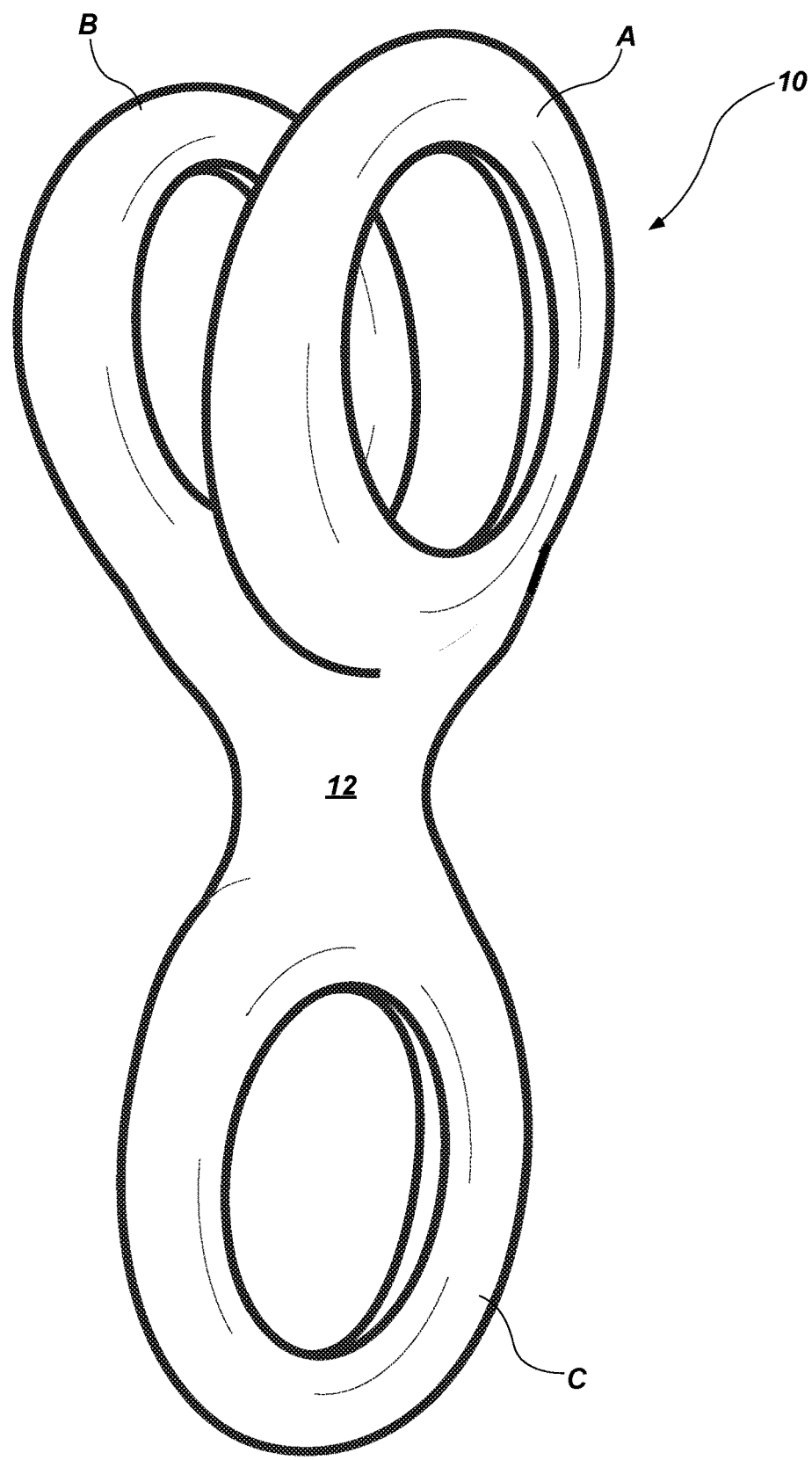
FIG. 7 is a perspective view of the knotless securing apparatus of FIG. 1.

As illustrated in FIG. 1, the first end portion 14 of the central support member 12 may include a surface area sufficient to provide a support abutment whereupon at least a portion of an elongated engaging member 20 (e.g., a rope, cord, or chain) can rest. For convenience, embodiments of the present disclosure are described with reference to a rope 20, although it is to be understood that the knotless securing apparatus 10 may be used with other elongated engaging members. A third receiving ring C may extend from the second opposing end portion 16 of the central support member 12. The receiving rings A, B, and C may each include an opening with an internal periphery sufficient to pass at least a portion of the rope 20 therethrough. By way of example and not limitation, the receiving rings A, B, and C may have an internal shape that is selected from the group of substantially circular (see, e.g., FIGS. 2 and 7), oval, oblong, rounded, triangular, or rounded trapezoidal. In some embodiments, as shown in FIGS. 2 and 7, for example, each of the receiving rings A, B, and C may have substantially the same size and shape. In other embodiments, the receiving rings A, B, and C may not have the same size and shape as each other. By way of example and not limitation, the third receiving ring C may be smaller than each of the first and second receiving rings A, B, and may have a different internal shape. In some embodiments, each of the receiving rings A, B, and C, may be in the shape of a torus.

The knotless securing apparatus 10 may be formed of a sufficiently rigid material, such as, for example metal (e.g., aluminum, steel), fiber-matrix composite, rigid polymer, or a combination thereof. The knotless securing apparatus 10 may have an internal core of metal and an external coating of polymer. The knotless securing apparatus 10 may be a single, unitary structure, and may be formed by welding, molding, and/or machining, for example.

Figure 5:
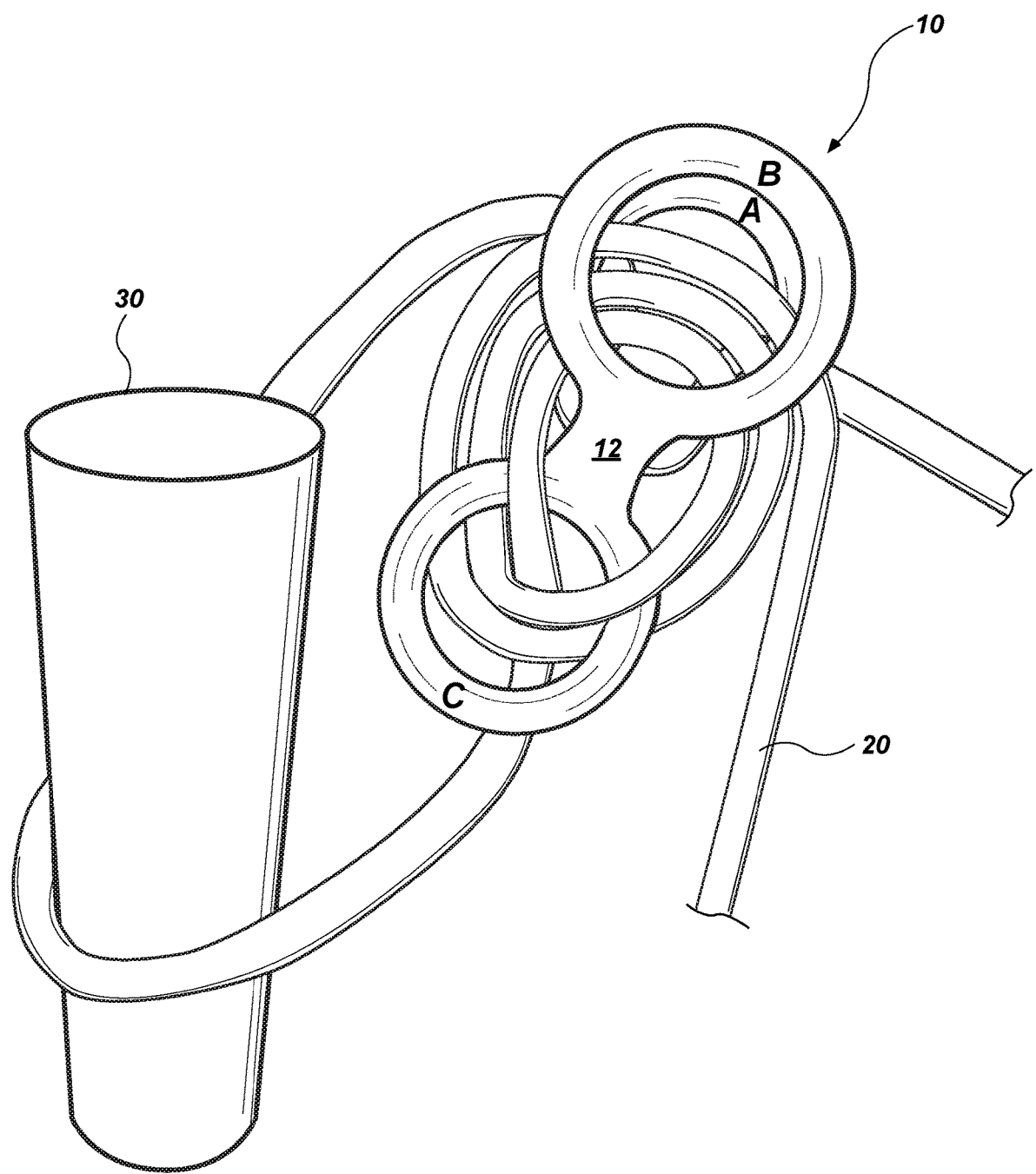
FIG. 5 is a perspective view of the knotless securing apparatus of FIG. 1 shown in use with an engaging member secured to a fixation member.
Figure 6:
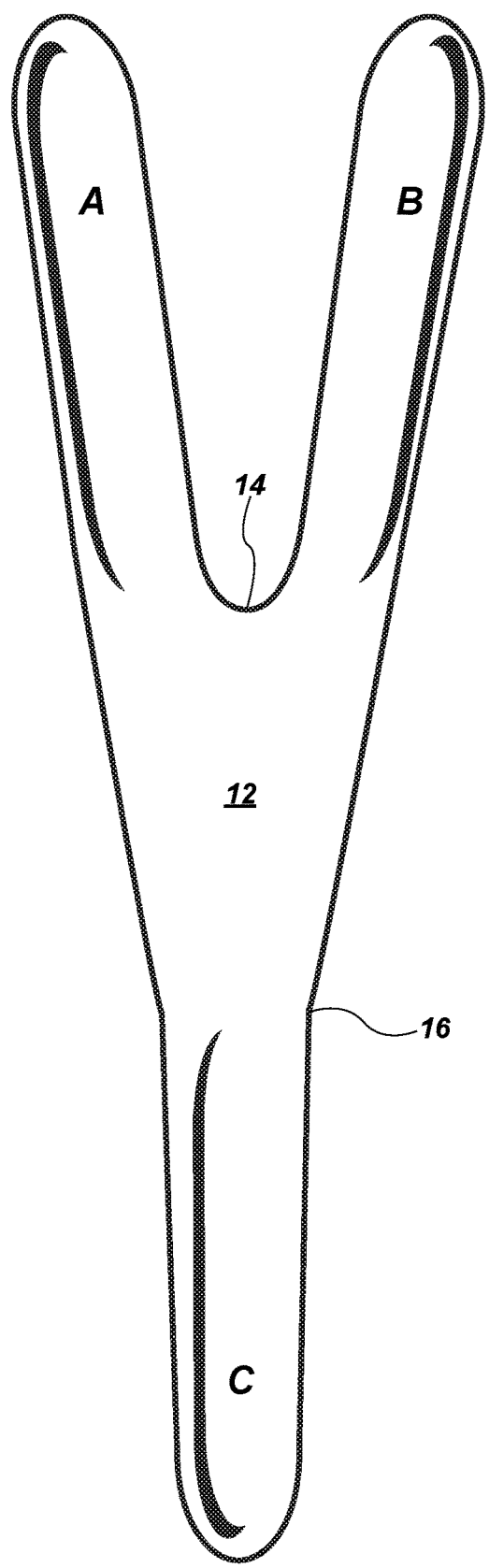
FIG. 6 is a side view of the knotless securing apparatus of FIG. 1.

As shown in FIGS. 1 and 6, when viewing the knotless securing apparatus 10 from a side view, the apparatus 10 may form the shape of a "Y." As will be appreciated by those of ordinary skill in the art, the receiving rings A, B, and C and the central support member 12 may be configured in various sizes and dimensions sufficient to engage and retain different sizes of at least a portion of a length of the rope 20 (e.g., rope, cord, chain, etc.), such as, for example, a ¼-inch diameter rope, a ½-inch diameter rope, or a ¾-inch diameter rope. Likewise, the dimensional space at the first end portion 14 of the central support member 12 that expands between the two receiving rings A, B may be sufficient to allow the size of at least a portion of the engaging member not to bind in the device, as shown in FIGS. 1-5 and 8, for example. A distance between the two receiving rings A, B at the first end portion 14 of the central support member 12 may be at least the size of the diameter of the rope to be used with the knotless securing apparatus 10. For example, the closest distance between the two receiving rings A, B at the first end portion 14 of the central support member 12 may be at least about ¼-inch, at least about ½-inch, or at least about ¾-inch. In further embodiments, the closest distance between the two receiving rings A, B at the first end portion 14 of the central support member 12 may be at least about twice the diameter of the rope to be used with the knotless securing apparatus 10, such as at least about 1 inch for use with a ½-inch rope.

Terms used in rope work:
a. The "running end" of the rope is the free end.
b. The "standing part" is the part of the rope fastened to a fixed structure or otherwise not active in knot tying.
c. The "working part" is the part of the rope that is active in knot tying.
d. A "bight" is a simple turn of a rope that does not cross itself.
e. A "loop" is a turn of a rope that does cross itself.

Figure 3:
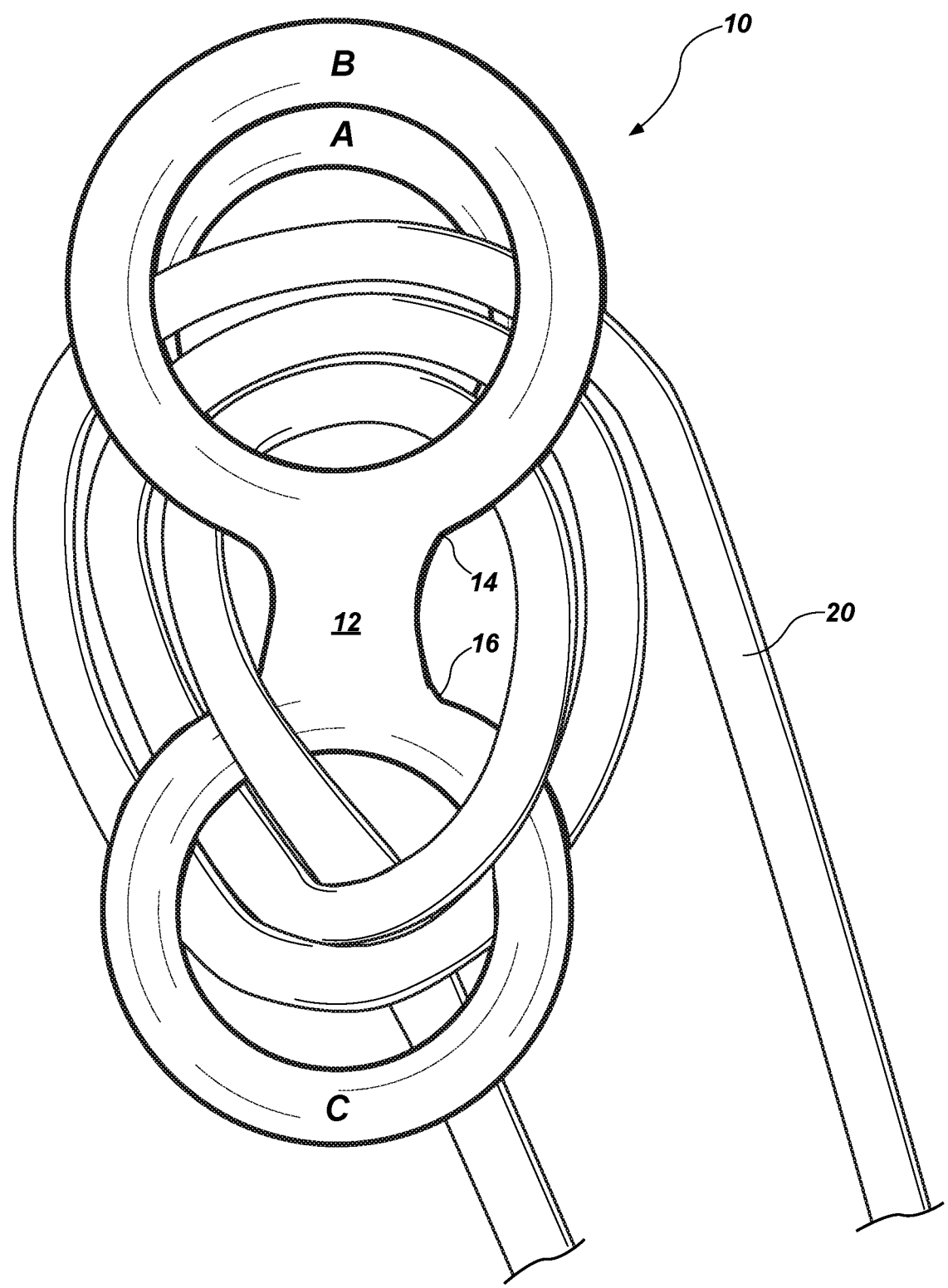
FIG. 3 is a perspective view of the knotless securing apparatus of FIG. 1 shown in use with another engaging member.

In one embodiment of using the knotless securing apparatus 10 of the present disclosure, the use of the knotless securing apparatus 10 may have several different applications, for instance, tying a horse to a post or other fixed structure. The first receiving ring A may be fastened around a fixed member, such as a post, fence, tree, etc. A bight on a rope that is attached to a horse may be placed through the third receiving ring C and over the second receiving ring B, as shown in FIG. 2. The top of the bight rests between the first and second receiving rings A and B, over the first end portion 14 of the central support member 12. This use is designed to allow the rope to slide through the device in case the horse hangs back. To secure the horse to the knotless securing apparatus 10, a running end or working part of the rope may be brought between the standing part of the rope and the third receiving ring C, around the second receiving ring B, being laid to rest on top of the existing bight on the rope. The running end or working part may be brought at least one more time between the third receiving ring C and the whole rope and back around the second receiving ring B being laid to rest on top of part of the rope that is on top of the bight. The rope is now locked and cannot be pulled free by pulling on the standing end, as shown in FIG. 3.

Figure 8:
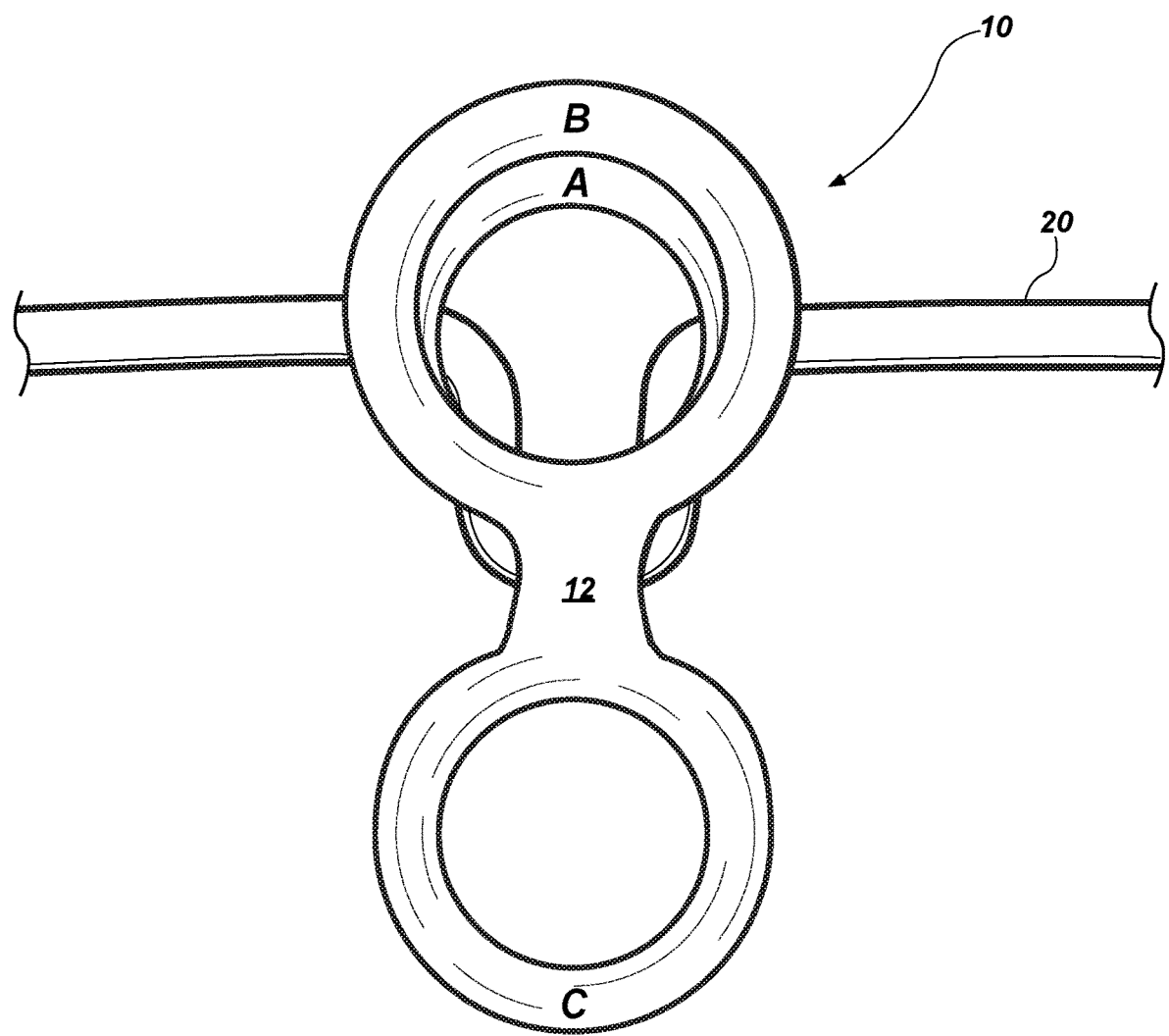
FIG. 8 is a perspective view of the knotless securing apparatus of FIG. 1 shown in use with an engaging member.

Referring to FIG. 8, to fasten the knotless securing apparatus 10 to a secondary object, a bight (as shown in FIG. 8) or loop on a rope attached to the secondary object may be placed through the outside of the first receiving ring A, over top of the second receiving ring B, and over the third receiving ring C. The loop or bight may rest on a side of the central support member 12 next to the first receiving ring A. Making a loop in lieu of a bight may inhibit (e.g., prevent) the knotless securing apparatus 10 from sliding on the rope. To secure the knotless securing apparatus 10 to a secondary object or securing point, such as a fixation member 30, using a single rope, the rope may be placed around or through the secondary object or securing point. A bight on the rope end may be pushed through the third receiving ring C and over the second receiving ring B. The working part or running end of the rope may be brought between the rope and the third receiving ring C, around the second receiving ring B, being laid to rest on top of the existing bight on the rope as explained above with reference to FIG. 3 and as shown in FIG. 5. The working part or running end may be brought one more time between the third receiving ring C and the whole rope and back around the second receiving ring B, being laid to rest on top of the part of the rope that is on top of the bight. The result is also shown from a different perspective in FIG. 4. The rope is now locked and cannot be pulled free by pulling on the working part or running end.

Figure 4:
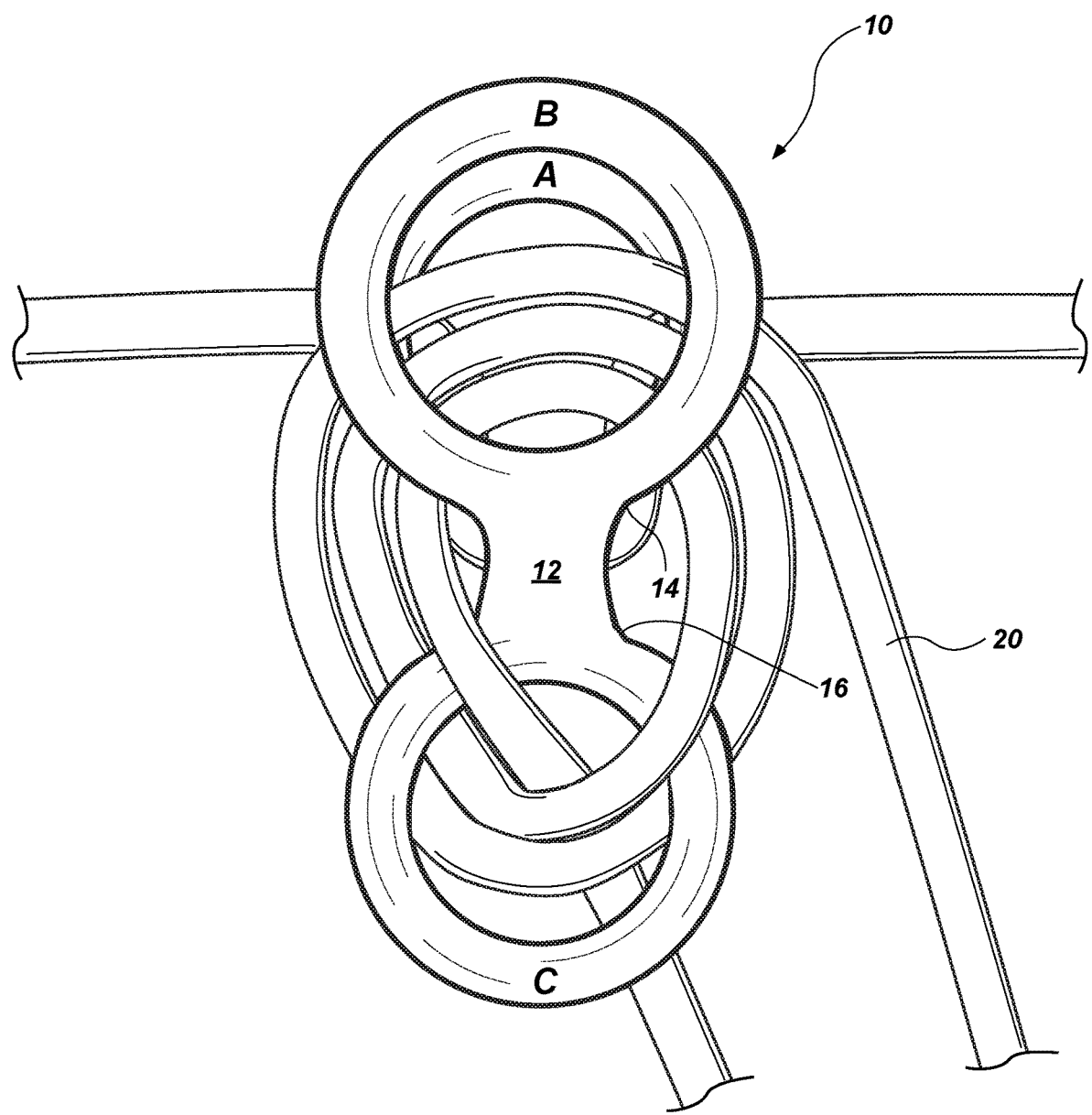
FIG. 4 is a perspective view of the knotless securing apparatus of FIG. 1 shown in use with two engaging members.

Referring to FIGS. 4 and 8, to create a picket line or add two ropes together, a bight or loop on the rope may be placed through the outside of the first receiving ring A, over the top of the second receiving ring B, and over the top of the third receiving ring C, as shown in FIG. 8. A bight on a secondary rope may be placed through the third receiving ring C and over the second receiving ring B. The running end or working part may be brought between the secondary rope and the third receiving ring C, around the second receiving ring B, being laid to rest on top of the existing bight on the secondary rope. The running end or working part may then be brought one more time between the third receiving ring C and the whole rope and back around the second receiving ring B, being laid to rest on top of the rope that is on top of the bight. The secondary rope is now locked and cannot be pulled free, as illustrated in FIG. 4.

To repel or belay with the knotless securing apparatus 10, a bight on a rope may be pushed through the third receiving ring C and over both of the first and second receiving rings A, B. A carabiner or other fastener may be used to fasten the climber to the first receiving ring A. If the climber wants to prevent a descent, he/she may take a working part or running end between the rope and the third receiving ring C, around the second receiving ring B being laid to rest between the two first and second receiving rings A, B at the first end 14 of the central support member 12. The rope end is brought one more time around going between the third receiving ring C and the rope and back around the second receiving ring B. The rope is now locked and cannot be pulled free.

Figure 9:
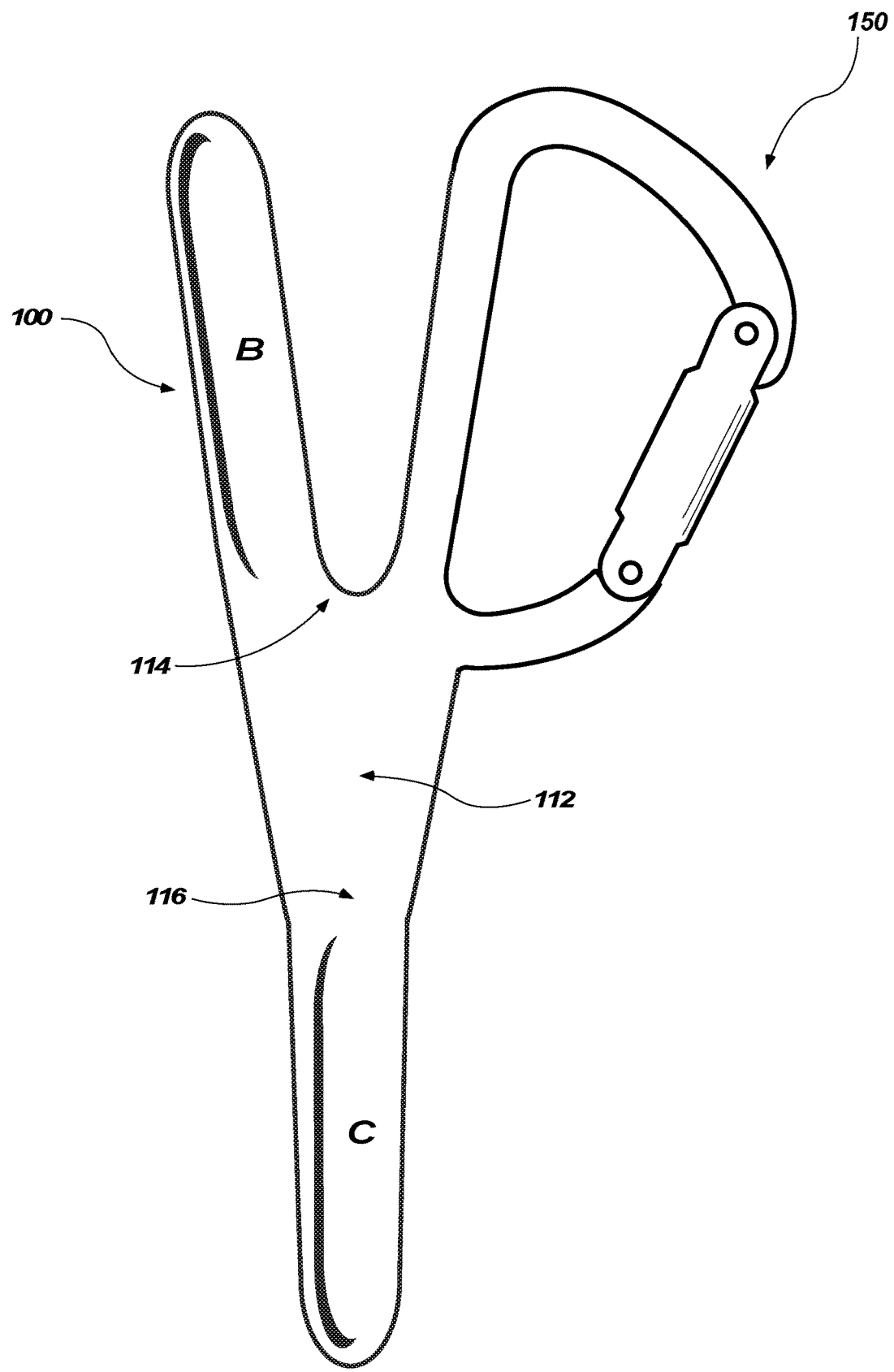
FIG. 9 is a side view of an embodiment of a knotless securing apparatus including a carabiner portion.

Referring to FIG. 9, in some embodiments, a knotless securing apparatus 100 may be similar to the knotless securing apparatus 10 described above, and may include a central support member 112 having a first end 114 and a second, opposite end 116. A second receiving ring B may extend from the first end 114 of the central support member 112, and a third receiving ring C may extend from the second end 116 of the central support member 112. However, the first receiving ring A of the knotless securing apparatus 100 may be replaced by a carabiner 150 or other attachment device for facilitating attachment to an object or structure. For example, the carabiner 150 may be used to quickly and easily hang the knotless securing apparatus 100 from a rope, chain, loop, tree branch, or other object or structure. The second receiving ring B and the third receiving ring C may be used as described above with reference to FIG. 3, for example, while the carabiner 150 is attached to the object or structure or, alternatively, while the carabiner 150 is not in use.

Figure 10:
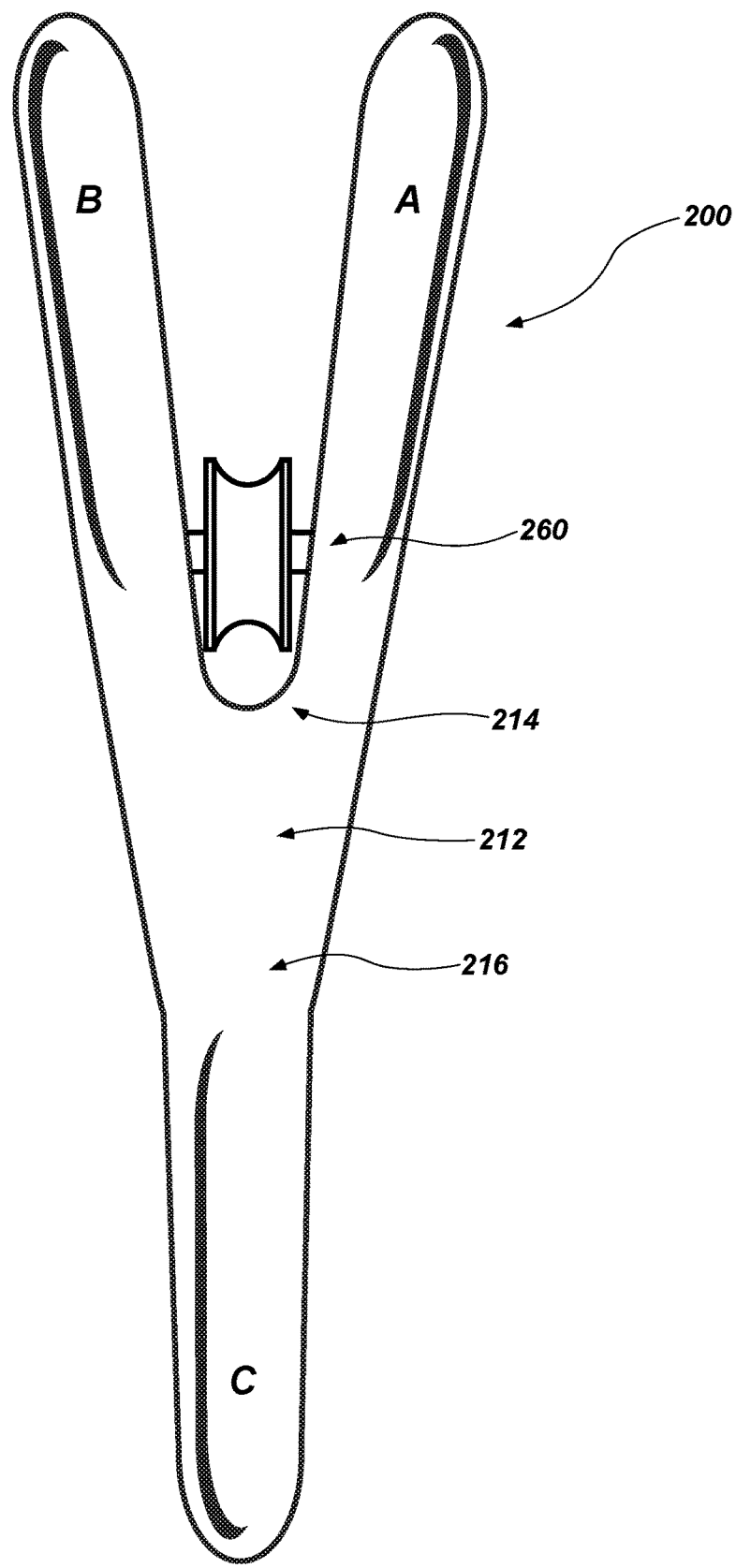
FIG. 10 is a side view of an embodiment of a knotless securing apparatus including a pulley wheel.

Referring to FIG. 10, in some embodiments, a knotless securing apparatus 200 may be similar to the knotless securing apparatus 10 described above, and may include a central support member 212 having a first end 214 and a second, opposite end 216. A first receiving ring A and a second receiving ring B may extend from the first end 214 of the central support member 212, and a third receiving ring C may extend from the second end 216 of the central support member 212. The knotless securing apparatus 200 may also include a pulley wheel 260 positioned proximate a base of the first and second receiving rings A and B and proximate the first end 214 of the central support member 212. The knotless securing apparatus 200 may be secured to an object or structure, such as by tying the first receiving ring A to the object or structure, and the knotless securing apparatus 200 may be used as a pulley by passing a rope over the pulley wheel 160. However, the pulley function of the knotless securing apparatus 200 may be overridden by passing a bight or loop of the rope passing over the pulley wheel 260 through the third receiving ring C and over the second receiving ring B. Further security may be accomplished by passing another bight or loop over the second receiving ring B again to preclude the rope from rolling over the pulley wheel 260.

Consistent with the foregoing, the knotless securing apparatus 10, 100, 200 and methods of using the same of the present disclosure are designed to secure an object or thing to another object or thing, while allowing a rope 20 to slip through the knotless securing apparatus 10, 100, 200 when tension or a load is applied, such as a horse hanging back, when desired. A horse that feels the rope slip, allowing a release in the pressure against him, will typically relax and return to where he is fastened. Furthermore, the knotless securing apparatus 10, 100, 200 can be fastened firmly to inhibit (e.g., prevent) the horse from pulling away, when desired.

In addition, the knotless securing apparatus 10 of the present invention may supplant a trucker's hitch and, under tension, the rope may be easily untied. As appreciated by one of ordinary skill in the art, the trucker's hitch is a self-binding hitch commonly used for cinching down and securing loads on trucks or trailers. There are several variations of the trucker's hitch, all of which use a loop in the standing part of the rope as a make-shift pulley in order to obtain a mechanical advantage. The rope in the trucker's hitch can become loaded and difficult or impossible to untie. On the other hand, the knotless securing apparatus 10 of the present disclosure may be used in a similar manner to firmly secure objects relative to one another and to cinch down, while also providing a means for releasing the securement even under tension or load. For example, the knotless securing apparatus 10 may be connected to a standing part of a rope as shown in FIG. 8. A working end of the rope may be looped around a fixed structure or object. The working end may then be looped through the third receiving ring C and around the second receiving ring B, as shown in FIG. 2. The working end may then be pulled down to cinch the rope. When the rope is sufficiently cinched down and taut, the working end may be secured to the knotless securing apparatus 10 as shown in FIG. 4. When the load is to be released, the working end may be unwound from the knotless securing apparatus 10.

The knotless securing apparatus 10, 100, 200 of the present disclosure may also be used to securely fasten a fixed object with an elongated engaging member 20 (e.g., rope, cord, or chain). The knotless securing apparatus 10, 100, 200 cart be used to hang a tarp, tie a hammock, hang a backpack, tie a horse to a tree, secure a boat, etc. It can also be secured in a picket line and an additional elongated engaging member can be fastened to it.

The knotless securing apparatus 10, 100, 200 of the present disclosure may also be used for belaying, repelling, and rescue operations and can be easily tied off and untied while a person (or other tension or load) is on the rope.

The embodiments of the disclosure described above and illustrated in the accompanying drawing figures do not limit the scope of the invention, since these embodiments are merely examples of embodiments of the disclosure. The invention is encompassed by the appended claims and their legal equivalents. Any equivalent embodiments lie within the scope of this disclosure. Indeed, various modifications of the present disclosure, in addition to those shown and described herein, such as other combinations and modifications of the elements described, will become apparent to those of ordinary skill in the art from the description. Such embodiments, combinations, and modifications also fall within the scope of the appended claims and their legal equivalents.

What is claimed is:

1. A knotless securing apparatus, comprising:
   a central support member having a first end portion and a second opposing end portion;
   a first receiving ring sized for receiving a bight of rope, the first receiving ring extending away from the first end portion of the central support member;
   a second receiving ring sized for receiving a bight of rope, the second receiving ring extending away from the first end portion of the central support member, wherein a first plane defined by an inner perimeter of the first receiving ring diverges away from a second plane defined by an inner perimeter of the second receiving ring at a non-parallel angle; and
   a third receiving ring sized for receiving a bight of rope, the third receiving ring extending away from the second opposing end portion of the central support member,
   wherein each of the first receiving ring, the second receiving ring, and the third receiving ring has substantially the same size and shape.

2. The knotless securing apparatus of claim 1, wherein the first and second receiving rings diverge away from each other at an angle of between about 5 degrees and about 25 degrees.

3. The knotless securing apparatus of claim 1, wherein the central support member has a greater width at the first end portion than at the second end portion.

4. The knotless securing apparatus of claim 1, wherein each of the first receiving ring, the second receiving ring, and the third receiving ring comprises a rigid material having an internal shape that is selected from the group of substantially circular, oval, oblong, rounded triangular, or rounded trapezoidal.

5. The knotless securing apparatus of claim 1, wherein the apparatus comprises a single, unitary structure.

6. The knotless securing apparatus of claim 1, wherein the knotless securing apparatus consists essentially of a material selected from the group consisting of metal, fiber-matrix composite, or a polymer.

7. The knotless securing apparatus of claim 1, wherein the knotless securing apparatus comprises a metal core covered by a polymer coating.

8. The knotless securing apparatus of claim 1, wherein a closest distance between the first receiving ring and the second receiving ring proximate the first end portion of the central support member is at least ½-inch.

9. A method of securing a rope to a knotless securing apparatus, comprising:
   providing a knotless securing apparatus having a central support member having a first end portion and a second opposing end portion, a first receiving ring extending away from the first end portion of the central support member, a second receiving ring extending away from the first end portion of the central support member, wherein a first plane defined by an inner perimeter of the first receiving ring diverges away from a second plane defined by an inner perimeter of the second receiving ring at a non-parallel angle, and a third receiving ring extending away from the second opposing end portion of the central support member, wherein each of the first, second, and third receiving rings has substantially the same size and shape and is sized to receive a bight of rope;
   passing a bight of a rope through the third receiving ring and over the second receiving ring to rest over the first end portion of the central support member between the second receiving ring and the first receiving ring; and
   passing a working part of the rope between a standing part of the rope and the third receiving ring, around the second receiving ring, and over the bight that is resting over the first end portion of the central support member.

10. The method of claim 9, further comprising passing the working part of the rope again between the standing part of the rope and the third receiving ring, again around the second receiving ring, and over the part of the rope that is over the bight.

11. The method of claim 9, further comprising securing the first receiving ring to a fixed object or structure.

12. The method of claim 11, wherein securing the first receiving ring to a fixed object or structure comprises passing a bight or loop of a rope through the first receiving ring, over the second receiving ring, and over the third receiving ring to rest on an outer surface of the central support member proximate the first receiving ring.

13. A knotless securing apparatus, comprising:
   a central support member having a first end portion and a second opposing end portion, the first end portion having a greater width than the second opposing end portion when the knotless securing apparatus is viewed from a side;

a first receiving ring comprising a first opening sized and shaped to receive a bight of a rope, the first receiving ring extending away from the first end portion of the central support member;

a second receiving ring comprising a second opening sized and shaped to receive a bight of a rope, the second receiving ring extending away from the first end portion of the central support member, the first and second receiving rings spaced apart and diverging away from each other at a non-parallel angle; and a third receiving ring comprising a third opening sized and shaped to receive a bight of a rope, the second receiving ring extending away from the second opposing end portion of the central support member, wherein the first receiving ring, second receiving ring, and third receiving ring form a Y shape when the knotless securing apparatus is viewed from the side.

14. The knotless securing apparatus of claim 13, wherein the first opening, second opening, and third opening each have a circular shape.

15. The knotless securing apparatus of claim 13, wherein the first and second receiving rings diverge away from each other at an angle between about 10 and 20 degrees.

16. The knotless securing apparatus of claim 13, consisting of a metal material.

17. The knotless securing apparatus of claim 16, wherein the metal material comprises at least one of steel or aluminum.

18. The knotless securing apparatus of claim 13, wherein each of the first receiving ring, second receiving ring, and third receiving ring has a torus shape.

19. The knotless securing apparatus of claim 13, wherein the first receiving ring comprises a carabiner.

* * * * *